No. 770,592.                                      Patented September 20, 1904.

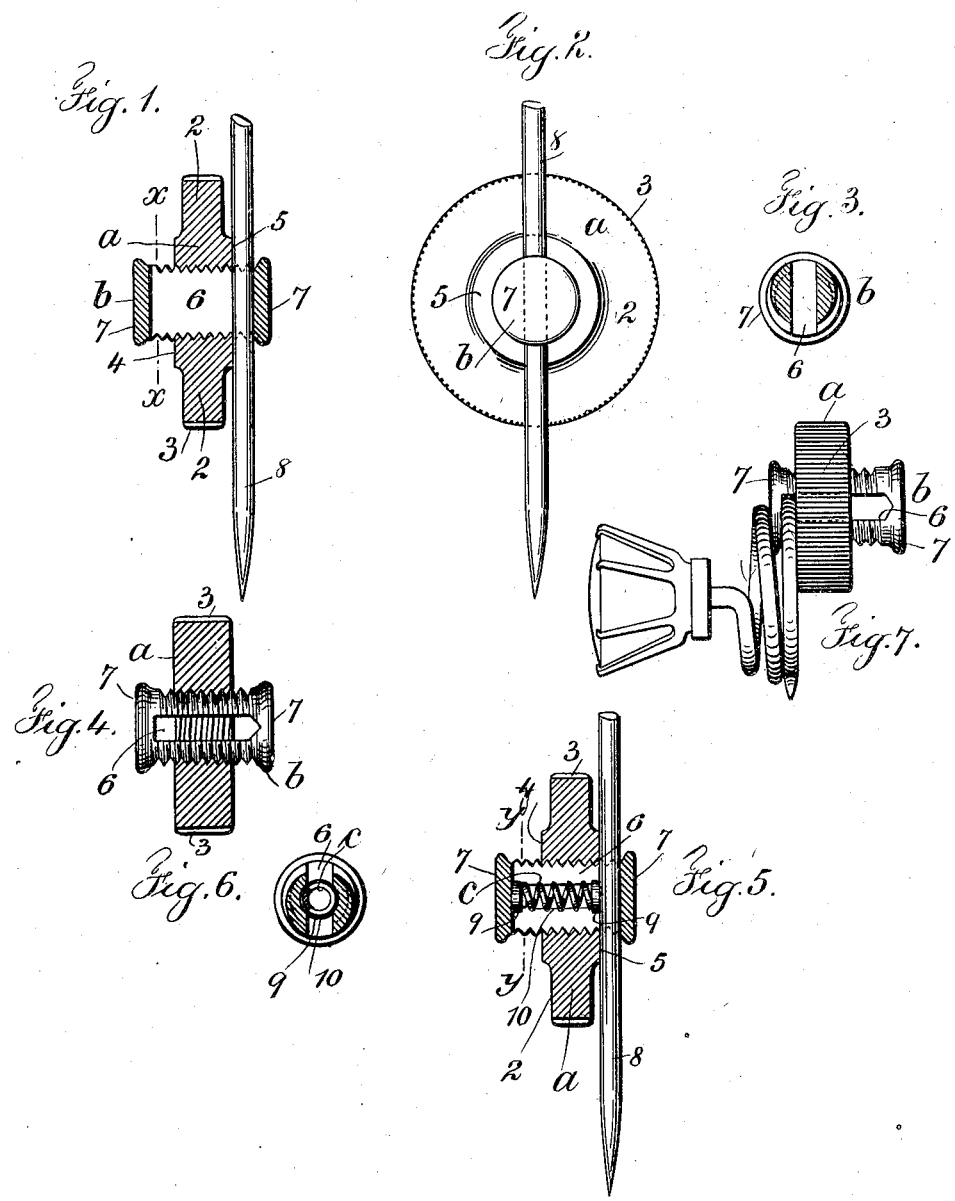

UNITED STATES PATENT OFFICE.

ADOLPH LANDAU, OF NEW YORK, N. Y.

SAFETY DEVICE FOR SCARF-PINS, STUDS, &c.

SPECIFICATION forming part of Letters Patent No. 770,592, dated September 20, 1904.

Application filed June 16, 1904. Serial No. 212,766. (No model.)

*To all whom it may concern:*

Be it known that I, ADOLPH LANDAU, a citizen of the United States, residing in the borough of Manhattan, in the city, county, and State of New York, have invented an Improvement in Safety Devices for Scarf-Pins, Studs, &c., of which the following is a specification.

My invention relates to a safety device for scarf-pins, studs, &c.; and the object thereof is the provision of a device of this class of simple and inexpensive construction and at the same time one of ready and easy application.

In carrying out my invention I employ a disk advantageously provided with a reduced peripheral portion, the edge of which is preferably knurled, and a screw-threaded shank provided with a longitudinal slot. The screw-threaded shank passes centrally and at right angles through the said disk, and the ends of the said shank are preferably upset to make the same irremovable from the said disk. The scarf-pin is to be passed through the slot between one end of the same and the adjacent face of the disk and is clamped in place by screwing the disk up into forcible contact therewith. I may also employ a spring placed longitudinally in the slot of the said shank to temporarily hold the device in position when adjusting the same to a scarf-pin, stud, or other article, all of which will be hereinafter more particularly set forth.

In the drawings, Figure 1 is a cross-section illustrating my improved safety device, and Fig. 2 is an end view of the same. Fig. 3 is a cross-section on line $x x$ of Fig. 1. Fig. 4 is a view taken at right angles to that shown in Fig. 1 and showing a differently-shaped disk. Fig. 5 is a sectional view of a modified form of my invention. Fig. 6 is a cross-section on line $y y$, Fig. 5; and Fig. 7 is a view illustrating the use of the safety device with a stud. All the figures are made on a greatly-exaggerated scale for clearness.

$a$ represents a disk of metal or any other suitable material, shown with a reduced peripheral portion 2, the edge of which is preferably knurled, as shown at 3. This structure provides bearing-surfaces 4 5 centrally upon the respective sides of the disk.

$b$ represents a shank, preferably screw-threaded and provided with a longitudinal slot 6. The shank $b$ passes at right angles centrally through the disk $a$, and the ends 7 thereof are preferably upset to make the same irremovable from the said disk.

As shown in Fig. 4, one of the ends of the slot 6 is angular, and the other is preferably cut square. As will readily be apparent in the operation of the safety device, the stem 8 of the scarf-pin or the screw-thread of a stud or the corresponding member of any similar device is passed through the slot 6 at either side of the disk $a$ and the disk turned either in one direction or the other, depending in which side the pin is placed, to bind the said pin between one of the ends of the slot in the shank $b$ and the bearing-surface of the disk $a$ on the side of the safety device through which the stem of the scarf-pin is passed.

As shown in Figs. 5 and 6, I may employ a helical spring $c$, provided at both ends with heads 9, normally adapted to bear against the ends of the slot 6, and the walls of the said slot may be provided with longitudinal recesses 10, into which portions of the convolutions of said spring pass to maintain the same in position. The function of the spring $c$ is to assist in the application of the safety device by bearing against the stem of the scarf-pin and temporarily holding the safety device in position while the stem of the scarf-pin is being made secure.

The safety device hereinbefore described is just as applicable to shirt-studs having screw-stems as it is to scarf-pins, hat-pins, and other similar articles, and for this purpose I prefer to make one end of the slot 6 in the shank $b$ square inasmuch as the convolutions of the stem of a screw-stud are more or less flattened, so that in using the device with a screw-stud this end of the slot may be employed, and thereby a better grip between the parts secured.

I claim as my invention—

1. A safety device for scarf-pins, studs, &c., comprising a disk and an irremovable shank passing through the said disk, movable therein and provided with a longitudinal slot of greater length than the thickness of the disk.

2. A safety device for scarf-pins, studs, &c., comprising a disk having a reduced peripheral portion and a central bearing-surface on either side thereof, and an irremovable shank passing centrally at right angles through said disk, movable therein and provided with a longitudinal slot of greater length than the thickness of the disk.

3. A safety device for scarf-pins, studs, &c., comprising a disk having a reduced peripheral portion and a central bearing-surface on both sides thereof, an irremovable screw-threaded shank passing at right angles centrally through said disk, movable therein and provided with a longitudinal slot, and means within the said slot for temporarily maintaining the device in position.

4. A safety device for scarf-pins, studs, &c., comprising a disk having a reduced peripheral portion and a central bearing-surface on both sides thereof, an irremovable screw-threaded shank passing at right angles centrally through said disk, movable therein and provided with a longitudinal slot, and a spring within said longitudinal slot adapted to temporarily maintain the device in position.

5. A safety device for scarf-pins, studs, &c., comprising a disk centrally perforated and interiorly threaded, and a screw-threaded shank having a longitudinal slot therein appreciably longer than the thickness of the disk, and said shank screwing through the perforation of the disk and adapted to engage the stem of a scarf-pin passed through the slot at one end.

6. A safety device for scarf-pins, studs, &c., comprising a disk centrally perforated and interiorly threaded and a screw-threaded shank having a longitudinal slot therein appreciably longer than the thickness of the disk cut square at one end and angular at the other end, and said shank screwing through the perforation of the disk and adapted to engage the stem of a scarf-pin passed through the slot at one end.

7. A safety device for scarf-pins, studs, &c., comprising a disk and a shank passing through said disk, movable therein and provided with means for receiving the stem of a scarf-pin or similar article therein and on either side of said disk.

8. A safety device for scarf-pins, studs, &c., comprising a disk and irremovable screw-threaded shank passing through said disk, movable therein and provided with means for receiving the stem of a scarf-pin or similar article therein and on either side of said disk.

Signed by me this 9th day of June, 1904.

ADOLPH LANDAU.

Witnesses:
 GEO. T. PINCKNEY,
 S. T. HAVILAND.